US006891112B2

(12) United States Patent
Weber

(10) Patent No.: US 6,891,112 B2
(45) Date of Patent: May 10, 2005

(54) LIFT SYSTEM FOR A PLATFORM, AND WEIGHING SYSTEM EQUIPPED WITH THE LIFT SYSTEM

(75) Inventor: René Weber, Oetwil an See (CH)

(73) Assignee: Mettler-Toledo GmbH, Greifensee (CH)

( * ) Notice: Subject to any disclaimer, the term of this patent is extended or adjusted under 35 U.S.C. 154(b) by 174 days.

(21) Appl. No.: 10/328,636

(22) Filed: Dec. 24, 2002

(65) Prior Publication Data

US 2003/0132037 A1 Jul. 17, 2003

(30) Foreign Application Priority Data

Jan. 11, 2002 (DE) .......................................... 102 01 008

(51) Int. Cl.[7] .............................................. G01G 19/00
(52) U.S. Cl. ...................... 177/145; 177/146; 187/394; 254/89 R
(58) Field of Search ................................ 177/145, 146; 187/394; 254/1, 89 R, 90, 91, 92, 89 H

(56) References Cited

U.S. PATENT DOCUMENTS

| | | | | |
|---|---|---|---|---|
| 3,987,549 A | * | 10/1976 | Robertelli | 433/128 |
| 4,002,215 A | * | 1/1977 | Harvill | 177/146 |
| 4,706,936 A | * | 11/1987 | Riedl | 254/89 R |
| 4,708,319 A | * | 11/1987 | Cruz | 254/45 |
| 4,903,946 A | * | 2/1990 | Stark | 254/45 |
| 5,056,170 A | * | 10/1991 | Kronshagen | 5/10.1 |
| 5,064,009 A | * | 11/1991 | Melcher et al. | 177/245 |
| 5,088,569 A | * | 2/1992 | Checcucci | 177/145 |
| 5,883,336 A | * | 3/1999 | Jones | 177/25.17 |
| 6,150,618 A | * | 11/2000 | Chou | 177/145 |
| 6,299,137 B1 | * | 10/2001 | Bainter | 254/89 H |
| 6,318,508 B1 | | 11/2001 | Inoue | 187/394 |
| 6,756,547 B2 | * | 6/2004 | Lefler | 177/141 |

FOREIGN PATENT DOCUMENTS

| | | | |
|---|---|---|---|
| DE | 3514804 | * | 11/1986 |
| DE | 3915430 | * | 9/1990 |
| FR | 2608142 | * | 6/1988 |

* cited by examiner

*Primary Examiner*—Randy W. Gibson
(74) *Attorney, Agent, or Firm*—Friedrich Kueffner

(57) ABSTRACT

A lift system for effecting a vertical parallel movement of a platform relative to a base, in particular for moving a sample changer platform of a sample changer in a weighing system, has at least three substantially identical and mutually interchangeable mechanical lift units supporting the platform. The lift units occupy an at least triangular flexible layout on the base. The lift system is equipped with a drive system that includes a transmission device and a drive element, wherein the transmission device connects the lift units among each other and to the drive element. The arrangement produces a simultaneous vertical movement of the lift units with the platform always staying aligned in a plane that is substantially orthogonal to the gravity force.

15 Claims, 5 Drawing Sheets

LIFT SYSTEM FOR A PLATFORM, AND WEIGHING SYSTEM EQUIPPED WITH THE LIFT SYSTEM

BACKGROUND OF THE INVENTION

The invention relates to a lift system that produces a vertical parallel movement of a platform relative to a base, and it also relates to a weighing system that has a sample changer equipped with the inventive lift system that produces the vertical parallel movement of a sample changer platform.

Lift systems are used in different technical fields where a vertical movement, e.g. of a platform or an object relative to a base is required.

For example in the field of weighing technology, a lift system in conjunction with a sample changer serves to transfer one or more weighing object units or weighing containers to a balance pan. In a frequently used arrangement, the balance pan is located above or below a sample changer position of a sample changer, where the balance pan and the sample changer are vertically movable in relation to each other.

A piece-counting apparatus with a balance is disclosed in U.S. Pat. No. 5,883,336. A rotating sample changer has receiver openings for a container into which the pieces are placed that are to be counted. An empty container is brought by the sample changer into the filling position above the balance. By means of a pneumatic lifting mechanism, a weighing platform is moved vertically to lift the container off the sample changer—by reaching through the receiver opening of the sample changer—in order to perform the weighing. The lifting mechanism in this apparatus has a pneumatic lifting cylinder arranged centrally below the weighing platform and, in addition, requires three guiding elements arranged around the lifting cylinder, each of which consists primarily of a pin guided in a sleeve.

Known technical solutions are in practical use for balances, in particular for comparator balances, where a sample changer working together with the balance is equipped with a single lift unit arranged in the middle of a platform that is vertically movable in relation to the weighing pan. This device is suitable for balances that are specified for smaller loads, e.g., in a range from a few grams up to a few kilograms because, due to the small overall dimensions of the sample changer and the balance pan, the vertical travel distance between the sample changer and the balance pan for the transfer of the weighing object is likewise relatively small. It is therefore possible to use a simple mechanical device, such as for example an eccentric, as a lifter unit, although the drive torque as well as the speed of the vertical movement are not constant over the vertical lifting range of an eccentric.

For balances with a fine resolution of the weighing result, it is of critical importance that after the transfer of one or more weighing object units onto the weighing pan, the combined center of gravity of the weighing object units should lie on a vertical line passing through the area where the load is introduced into the weighing cell. It is therefore a requirement that the vertical movement, e.g. for seating the weighing object on the sample changer, occurs in exact parallel alignment relative to the weighing pan and furthermore in a sufficiently gentle and jolt-free manner so that the weighing object units will not shift their positions relative to each other during the transfer.

As a principal observation, in the case of low-capacity balances that have a sample changer equipped with a centrally arranged lift unit, the small amounts of torque occurring in the transverse direction are not significant enough to present a problem. Nevertheless, if a balance of the same type is designed for larger loads, a single lift unit arranged in the middle of a platform that is vertically movable relative to the weighing pan can prove to be a problem. When the relatively heavy platform is raised and lowered, transverse forces can occur that have an adverse effect on maintaining exact parallelism in the movement of the platform. Constraining the movement in conformance with the existing state of the art by means of several guiding elements arranged around a central lift unit requires a large amount of space and allows little flexibility. Furthermore, in the case of pneumatic as well as hydraulic lifting systems, preventive measures have to be taken against an accidental lowering of the platform from the lifted position, e.g., if there is a malfunction.

OBJECT OF THE INVENTION

It is therefore the object of the present invention to provide a lift system that is capable of sustaining the transverse torques, in particular for a relatively heavy platform, e.g., for a sample changer in a high-capacity weighing system, and that is also capable of vertically moving the platform in a jolt-free manner and maintaining parallelism. At the same time, the objective also calls for a space-saving and flexible arrangement of the lift system.

SUMMARY OF THE INVENTION

In accordance with the present invention, a lift system for the vertical parallel movement of a platform relative to a base is equipped with at least three mutually interchangeable mechanical lift units of the same kind carrying the platform. The lift units are arranged in an at least triangular flexible layout on the base. The lift system has a drive system with a transmission device and a drive unit, wherein the transmission device connects the lift units to each other and to the drive unit. As a result, the lift units move up and down simultaneously and, consequently, the platform is always aligned in a plane that is substantially orthogonal to the direction of the gravity force.

With a lift system that has a plurality of lift units acting on the platform on more than one point or one line, it is possible to prevent the occurrence of transverse forces. The parallelism of the platform movement relative to a base that carries the lift units is assured, because there is a common drive system for all of the lift units and because the lift units are of the same kind and are mutually interchangeable. It is particularly advantageous if the lift units are to a large extent identical.

The arrangement of the lift units on the base is flexible, the only condition being that they form at least a triangle. This allows spaces to be freed up below the platform where other assembly groups can be accommodated and arranged; for example, a space can be freed up in a weighing system to accommodate the weighing unit that includes the weighing cell. This leads to a compact configuration of the overall system.

In contrast to a lift system consisting of several mechanical lift units where each of the lift units has its own drive unit, the lift system according to the invention has the advantage that it does not require any measures for the synchronization of the lift units. The inventive lift system is designed to produce a simultaneous vertical movement of all lift units. The lift units to be used in the inventive lift system are preferably of a kind in which the driving force or driving torque as well as the speed of the vertical movement are substantially uniform over the entire vertical lifting range.

In an advantageous embodiment of the invention, the lift system is driven by an endless drive belt, in particular a spur belt, where each lift unit is equipped with a gear pulley and the spur belt is in form-fitting engagement with the gear pulley. The drive unit is preferably an electric motor.

In a particularly advantageous embodiment, each lift unit is configured as a lifting cylinder with a cylinder tube and a cylinder rod, where the cylinder rod is connected to the movable platform and is movable axially by means of a spindle that is guided in a threaded nut. This provides the lift system with an inherent intrinsic safety with regard to a malfunction. If the drive unit fails or the spur belt breaks, the lift units and the platform resting on them will be kept in their current position and will not drop. The spindles of all of the lift units have external threads of substantially the same pitch.

In view of the variance due to manufacturing tolerances in the production of mechanical components, it is a particularly significant feature of the invention that each lift unit is individually adjustable and that the individual adjustability of each lift unit remains available even after the lift unit has been installed in the lift system.

The lift system according to the invention is particularly well suited for use in a weighing system, especially if the weighing system is equipped with a sample changer. Thus, according to the invention, a weighing system that has a weighing unit with a weighing pan and a sample changer for transferring the weighing object from the sample changer to the weighing pan has a lift system equipped with at least three mechanical lift units that are of the same kind, mutually interchangeable, carrying a sample changer platform, and occupying an at least triangular flexible layout on a base. The lift system further includes a drive system with a transmission device and a drive unit, wherein the drive system effects a simultaneous vertical movement of the lift units. At all positions of vertical displacement, the sample changer platform is always aligned in a plane that is substantially orthogonal to the direction of gravity.

Since this kind of weighing system is preferably equipped with a weighing cell that works according to the principle of electromagnetic force compensation, the lift system is made substantially of non-magnetic materials.

In a preferred embodiment of the inventive weighing system, the sample changer has a tray that is rotatable on the platform and that is configured to be raised and lowered together with the platform.

The weighing system is modular, which means that the weighing unit can easily be removed from the sample changer for servicing. The weighing unit in this arrangement has an understructure that allows the weighing unit to be set either on rollers so that it can be pulled out from an opening in the sample changer or to be set on feet when the weighing unit is installed inside the sample changer.

A lift system according to the invention can be employed particularly in situations where a lifting mechanism for large and heavy objects is needed and where at the same time a high degree of precision is required in the control of the lifting movement. The flexibility of the inventive lift system is also of advantage where platforms have to be lifted that are for example asymmetric, because the lift units can be arranged to support the platform at the places where they are required.

BRIEF DESCRIPTION OF THE DRAWINGS

Details of the invention are described below based on an example from the field of weighing technology embodied in a comparator balance with a sample changer which is illustrated in drawings using a largely schematic drawing format, wherein.

DETAILED DESCRIPTION OF PREFERRED EMBODIMENTS

Figure 1:
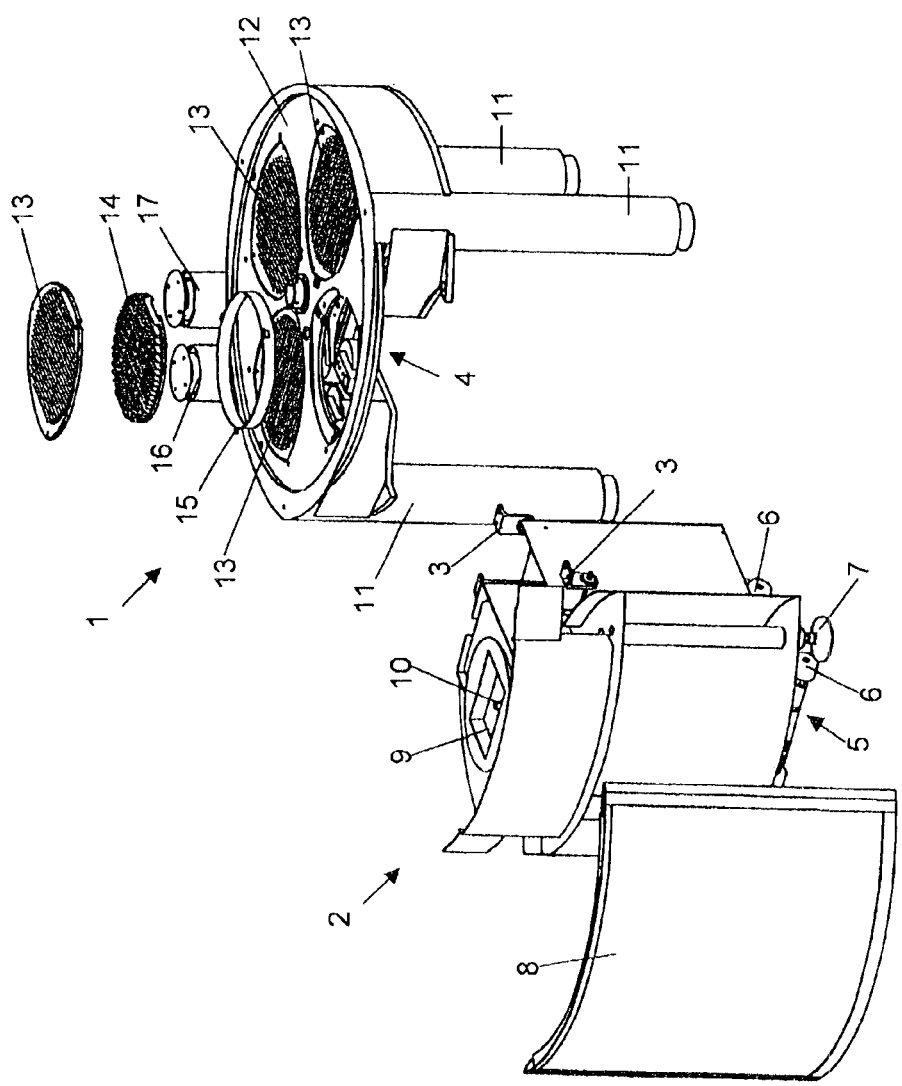
FIG. 1 shows an overall view of the weighing system in a perspective representation, wherein the weighing system has been taken apart to show the individual assembly groups.

FIG. 1 illustrates the weighing system which consists substantially of a sample changer 1 and a weighing unit 2, shown taken apart in a three-dimensional view. Facing the viewer is the weighing unit 2, which is accommodated in a separate housing. To the right and more towards the background of FIG. 1 is the sample changer 1. The latter has an opening 4 for the weighing unit 2. To move the weighing unit into position, the weighing unit 2 has an understructure 5 which allows the weighing unit to be selectively set either on rollers 6, e.g., to move the weighing unit out of the opening 4 for servicing, or on feet 7. When the weighing unit 2 is installed in its operating position within the opening 4, it is set on three feet 7 (only one being visible in the drawing) by raising the rollers. By means of the fastener elements 3, the weighing unit 2 is attached to the sample changer 1, so that it can no longer change its position. The weighing unit 2 is enclosed at the front by a cover panel 8. A force-transmitting rod member 10 that connects to the weighing cell (not shown) protrudes from the top of the weighing unit 2, set back in a recess 9 for protection from air drafts.

The sample changer 1 stands on three cylindrical pillars 11, each of which is height-adjustable at its bottom end for the purpose of leveling the sample changer. A circular tray 12 that is rotatable about its center point has sample receivers 13 arranged in four positions spaced at angles of 90° from each other. The sample receiver 13 is configured as a grate, so that a weighing pan 14 with protruding ridges can reach through the grate to pick up one or more weighing object units from the sample receiver 13 that is currently in the position above the weighing pan 14. In FIG. 1, the sample receiver 13 and the weighing pan 14 in the forward-facing sample changer position are shown taken apart. The ring 15 serves for additional protection of the weighing pan 14 from the influence of air drafts. Two drive units 16, 17, on the one hand for a rotary movement (drive unit 17) of the tray 12, and on the other hand for an up and down movement (drive unit 16) are connected to the sample changer 1.

Figure 2:
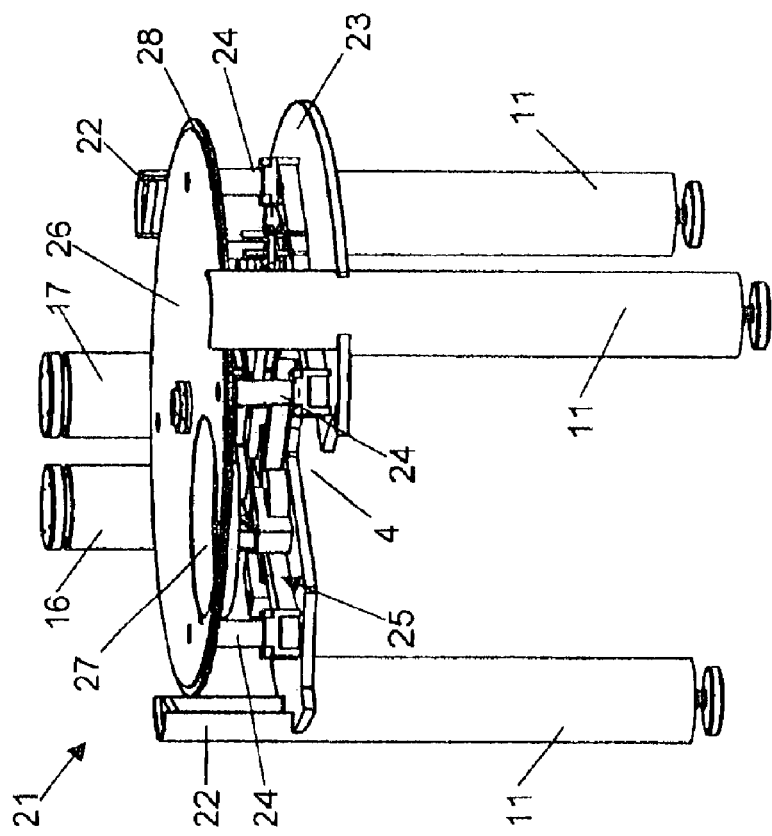
FIG. 2 shows the lift system in a three-dimensional view.

FIG. 2 shows the lift system 21 of a sample changer 1 in a three-dimensional representation, viewed at a slight downward angle. The pillars 11 on which the sample changer 1 is supported have a horizontal step at about three fourths of their total height, where the profile shape of a hollow cylinder changes into a post 22 with the profile of a circular arc with the same radius as the pillar 11. The step in the pillar profile supports a base plate 23 that serves as mounting base for the lift system 21.

Four lift units 24 (three of which are visible in FIG. 2) are bolted onto the base plate 23. The transmission device 25, which connects the lift units 24 to each other and to the drive unit 16, is likewise accommodated on the base plate 23. The platform 26, extending parallel to the base plate 23, is supported by the four lift units 24 which can raise and lower the platform 26 in relation to the base plate 23. Besides the lift units 24, there is no other connection between the platform 26 and the base plate 23.

The platform 26 has a circular passage opening 27 for the weighing pan 14 (see FIG. 1). The platform 26 is of a circular shape and has a step 28 along its circumference that serves to guide the rotary movement of the tray 12 (see FIG. 1). The tray 12 is supported by rollers that run along the step 28 as the tray turns in a circle. Furthermore, FIG. 2 also shows the opening 4 for the weighing unit 2.

Figure 3:
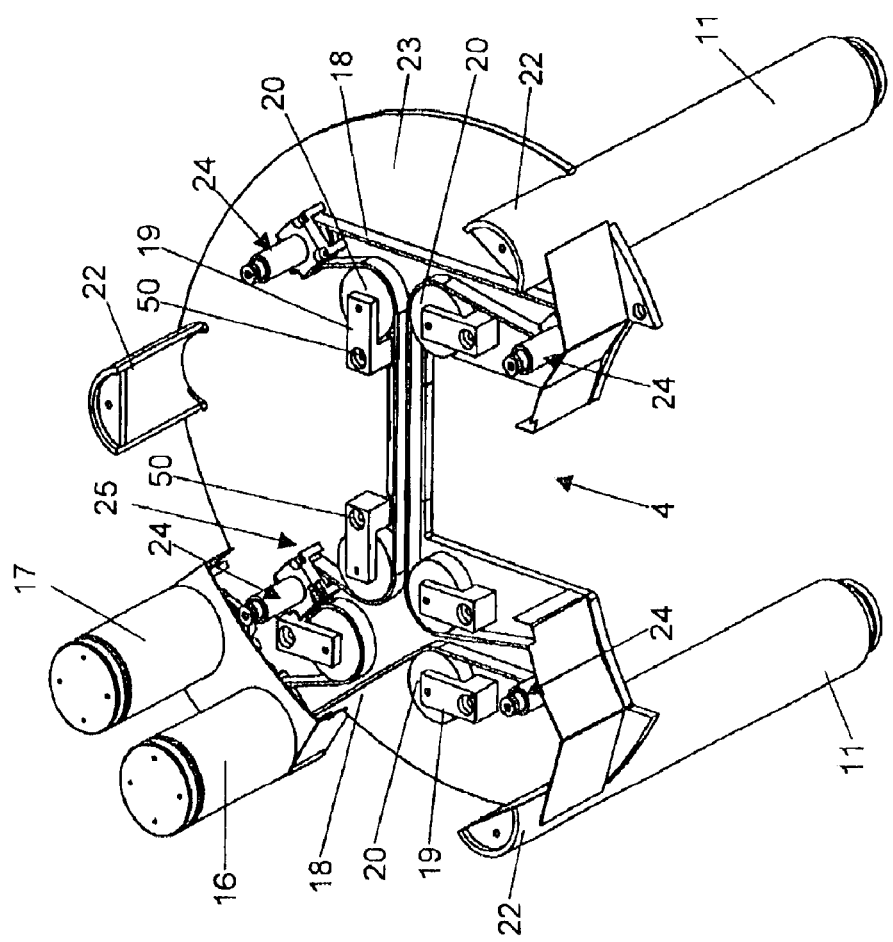
FIG. 3 shows the drive system in a three-dimensional view.

FIG. 3 represents a three-dimensional illustration of the base plate 23 with the platform 26 taken off, viewed at a slightly downward-directed angle. As shown in this drawing, the transmission device 25 for the lift system 21 is mounted on the base plate 23. In the interest of clarity, the rotation mechanism, which is likewise mounted on the base plate 23 and is driven by the drive unit 17, has been omitted in the drawing. The drive unit 16, preferably an electric motor, serves to drive the lift system 21. The four lift units 24 are connected to each other and to the drive unit 16 by an endless spur belt 18. The spur belt 18 is trained over six guide pulleys 20 that are installed on the base plate 23 by means of pulley mounts 19, so that the spur belt 18 runs without crossings in a closed loop parallel to the surface of the base plate 23, connecting the drive unit 16 and all four lift units 24. This assures that all lift units 24 are driven simultaneously. The concept of driving the lift units simultaneously and the substantially identical design of the lift units 24 among each other are prerequisites for maintaining parallelism in the raising and lowering of the platform 26 (not shown in FIG. 3) in relation to the base plate 23 by means of the lift units 24.

The pulley mounts 19 for the guide pulleys 20 are bolted onto the base plate 23. By slightly loosening the screw 50 of any of the pulley mounts 19, the respective pulley mount with its pulley 20 can be swiveled slightly about the axis of the bolt, whereby the spur belt is loosened or tightened. The drive unit 16, preferably an electric motor, can reverse its sense of rotation for the up and down movement of the lift units 24.

The base plate 23 and the platform 26 are aligned in a plane that extends orthogonal to the direction of the gravity force, so that a precise transfer of one or more weighing object units can be performed from the sample receiver 13 to the weighing pan 14 (see FIG. 1).

Figure 4:
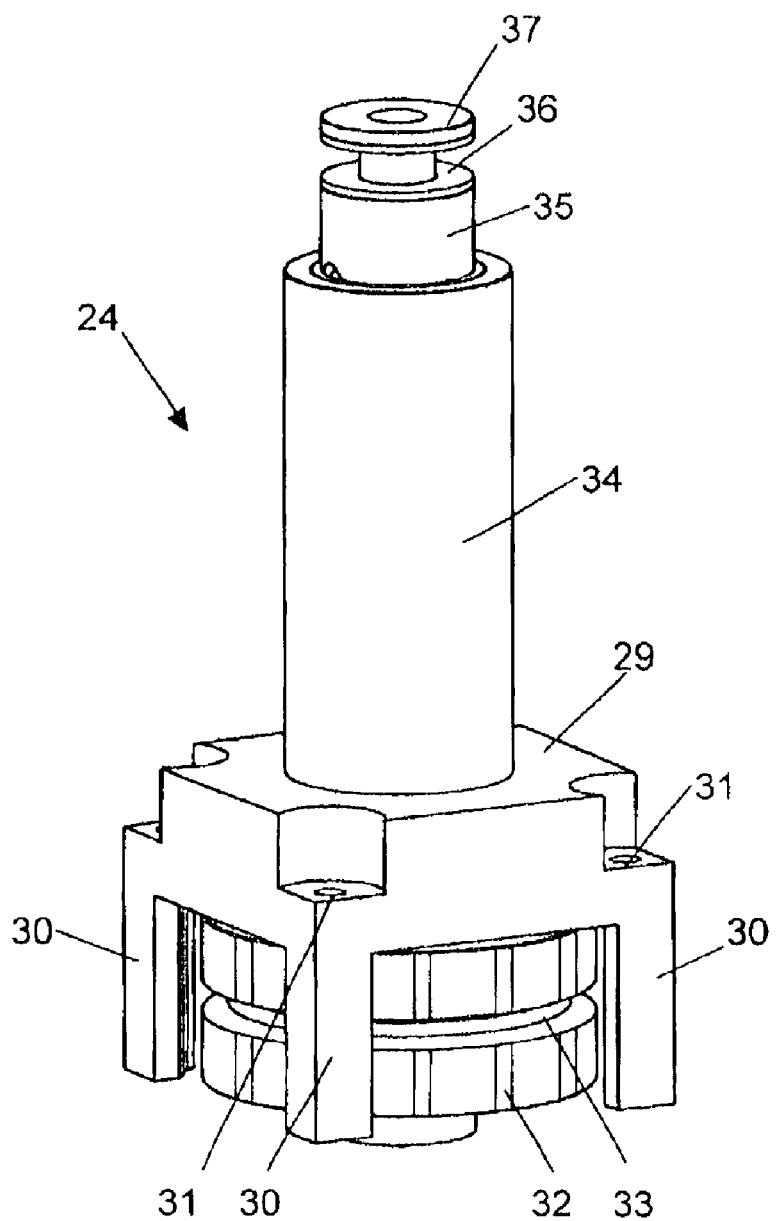
FIG. 4 shows a lift unit in a three-dimensional view.

FIG. 4 shows a lift unit 24 in a perspective representation. It has a mounting socket 29 standing on four stilts 30, each of which has a screw hole 31 to hold a screw for fastening the mounting socket 29 to the base plate 23. Between the stilts below the mounting socket 29, there is a gear pulley 32 designed for a form-fitting engagement with the spur belt 18. The gear pulley 32 has a groove 33 around its circumference to receive a precisely fitting ridge of the spur belt 18.

Connected to the top of the mounting socket 29, the cylinder tube 34 extends vertically upward. A cylinder rod 35, shown protruding from the cylinder tube in FIG. 4, is guided inside the cylinder tube and constitutes the vertically movable part of the lift unit 24. The cylinder rod 35 has a narrower section at its upper end forming a horizontal ledge 36. The ledge 36 supports the platform 26 (not shown here), which can be clamped between the ledge 36 and a clamping disk 37 that can be screwed tightly onto the lift unit 24. All four lift units 24 are held in this manner between the base plate 23 and the platform 26. It is important for the lift units 24 to be in exact vertical alignment on the base plate 23, so that the platform 26 can be aligned parallel to the base plate 23 and orthogonal to the direction of the gravity force.

Figure 5:
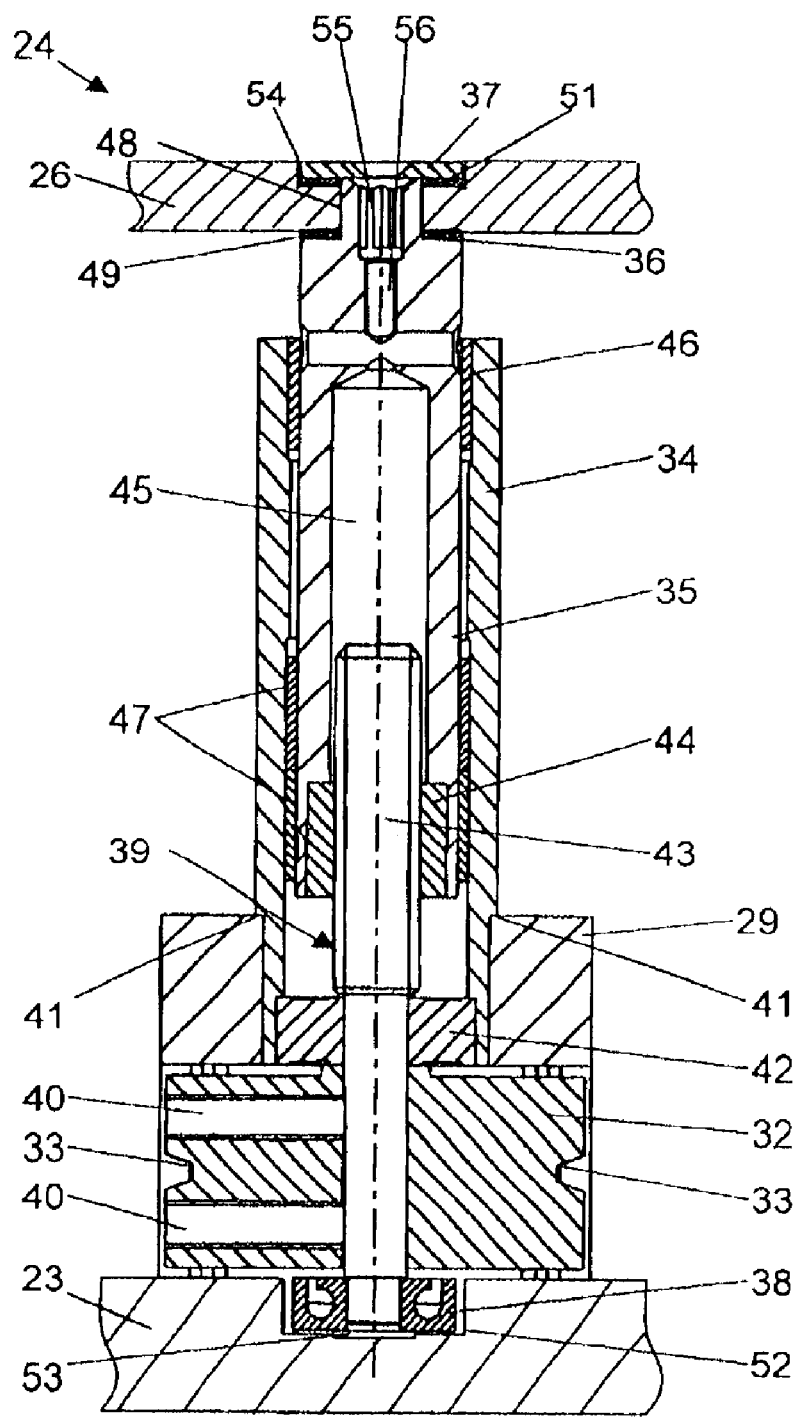
FIG. 5 shows a lengthwise section through a lift unit.

FIG. 5 shows a lengthwise section through a lift unit 24. The drawing also illustrates at the same time how a lift unit 24 is installed as the connecting element between the base plate 23 and the platform 26. Each lift unit 24 has at its lower end an axial bearing 38 in which a spindle 39 is rotatably supported. The axial bearing 38, which serves to take up axial forces, is accommodated in an appropriately configured recess 52 of the base plate 23. The recess 52 has a further set-back portion 53 at the center, so that the rotating spindle 39 has no contact with the base plate 23.

The gear pulley 32, which is surrounded as well as covered at the top by the mounting socket 23, is fixed on the spindle 39 by two set screws (not shown in drawing) for which the tapped holes 40 are provided. The gear pulley 32 has a groove 33 around its circumference to receive the spur belt 18 in a form-locking engagement. The cylinder tube 34 is inserted in the mounting socket 29 from above and is seated on the top surface of the mounting socket 29 by means of a step 41. The cylinder tube 34 forms the housing for the lift unit 24 and also serves as a guide for the cylinder rod 35 that moves inside the cylinder tube 34. The bottom end of the cylinder tube 34 holds a radial bearing 42 that absorbs the radially directed forces exerted on the spindle 39 by the spur belt. The section 43 of the spindle 39 that extends above the radial bearing 42 has an external thread. As a counterpart to the external thread, a threaded nut 44 is fixedly installed in the cylinder rod 35 which runs coaxially inside the cylinder tube 34, where the threaded nut 44 is interposed between the cylinder rod 35 and the spindle 39. The external thread of the spindle 39 runs in the internal thread of the threaded nut 44 whereby the nut, and thus the cylinder rod 35, is moved up and down relative to the cylinder tube 34. An upper polymer bearing 46 and a lower polymer bearing 47 are interposed between the cylinder rod 35 and the cylinder tube 34 to guide the movement of the cylinder rod 35.

The cylinder rod 35 contains a hollow space 45 to receive the spindle 39 as the lift unit 24 moves downward. At the top, the cylinder rod 35 protrudes from the cylinder tube, and the upper end of the cylinder rod 35 has a stepped-down section 48 forming a horizontal ledge 36. The stepped-down section 48 of the cylinder rod 35 is inserted in the platform 26 which rests on the ledge 36, with a rubber shim 49 inserted for damping. The platform 26 is attached to the lift unit 24 by inserting a clamping disk 37 in the recess 54 of the platform 26 and fastening the clamping disk 37 to the cylinder rod 35 with a screw from the top. As a damping measure, it is recommended to also insert a rubber shim 51 between the platform 26 and the clamping disk 37.

As the spur belt 18 connects all of the lift units 24 to each other and to the drive unit 16, all four lift units 24 are moved together at the same time. With the lift units 24 being substantially identical, in any event at least of the same type and mutually interchangeable, the arrangement performs a synchronous vertical movement of the cylinder rods 35 of all four lift units 24, whereby the platform 26 remains parallel to the base plate 23. The movement is jolt-free, and the transfer of the weighing object units from the sample receiver 13 of the sample changer 1 to the weighing pan is gentle enough so that the weighing object units will not change their positions relative to each other.

Differences between the lift units 24 that are due to manufacturing tolerances, e.g., variations between the pitches of the spindles 39 and possibly other components of the lift system, can be compensated by a height adjustment. To allow this adjustment, the cylinder rod has a hexagonal hole 55 above the tapped hole 56 that serves to fasten the clamping disk 37. By inserting a matching key into the hexagonal hole 55 and turning the cylinder rod up or down, the lift system can be level-adjusted even in the installed condition of a lift unit 24 and with the spur belt 18 pulled tight.

The mechanical lift units 24 that are driven by a spindle 39 running in a threaded nut 44 put a substantially constant torque load on the drive unit and produce a lift movement of substantially uniform speed over the entire vertical lifting range. Furthermore, the intrinsic safety is inherently assured for this type of lift drive. This means that in case of a power failure of the drive unit 17 or if the spur belt 18 breaks, the lift units 24, and thus the platform 26, are held at their current positions, and an abrupt fall of the platform is not possible.

What is claimed is:

1. A weighing system comprising a weighing unit (2) with a weighing pan (14), and further comprising a sample changer (1) with a lift system for transferring weighing objects from the sample changer (1) to the weighing pan (14), wherein the lift system comprises at least three substantially identical and mutually interchangeable mechanical lift units (24) supporting a sample changer platform (26), said lift units occupying an at least triangular flexible layout on a base (23), wherein the lift system further comprises a drive system with a transmission device (25) and a drive unit (16), and wherein the drive system effects a simultaneous vertical movement of the lift units (24) within a lifting range.

2. The weighing system according to claim 1, wherein the sample changer platform (26) is always aligned in a plane that is substantially orthogonal to a local direction of gravity.

3. The weighing system according to claim 1, wherein the transmission device (25) comprises a drive belt running in a closed loop, connecting the lift units (24) among each other and to the drive unit (16).

4. The weighing system according to claim 3, wherein the drive belt comprises a spur belt (18) and each lift unit (24) comprises a gear pulley (32), the spur belt (18) being in form-fitting engagement with the gear pulley.

5. The weighing system according to claim 3, wherein the transmission device (25) comprises guide pulleys guiding the drive belt along the base (23) without belt crossings.

6. The weighing system according to claim 1, wherein the drive unit (16) comprises an electric motor.

7. The weighing system according to claim 1, wherein the lift units (24) require from the drive unit (16) a substantially constant driving torque over the lifting range and produce a vertical movement of substantially constant speed over the lifting range.

8. The weighing system according to claim 1, wherein each lift unit (24) comprises a lift cylinder with a cylinder tube (34), a cylinder rod (35), and a spindle (39), the cylinder rod (35) being connected to the platform (26) and axially movable relative to the cylinder tube (34) by means of the spindle (39).

9. The weighing system according to claim 8, wherein each lift unit (24) comprises at least one bearing (46, 47) made of a polymer material and being arranged between the cylinder tube (34) and the cylinder rod (35).

10. The weighing system according to claim 8, wherein each lift unit (24) comprises a threaded nut (44) and the spindle (39) has an external thread, the spindle (39) being guided in the threaded nut (44).

11. The weighing system according to claim 1, wherein each lift unit (24) is individually adjustable while said lift unit is in an installed state in the lift system.

12. The weighing system according to claim 1, wherein the lift system is made substantially of a non-magnetic material.

13. The weighing system according to claim 1, wherein the sample changer (1) has a tray (12) rotatable on the platform (26) and configured to be raised and lowered together with the platform (26).

14. The weighing system according to claim 1, wherein the weighing unit (2) can be removed from the sample changer (1) in a simple manner for servicing.

15. The weighing system according to claim 1, wherein the weighing unit (2) comprises an understructure (5) with rollers (6) and feet (7), so that the weighing unit can be put on the rollers (6) for moving the weighing unit in and out of an opening (4) of the sample changer (1), and on the feet (7) when the weighing unit is installed inside the sample changer (1).

* * * * *